United States Patent [19]

Kuwata et al.

[11] 4,189,552
[45] Feb. 19, 1980

[54] METHOD FOR PREPARING VINYL CHLORIDE POLYMERS

[75] Inventors: Satoshi Kuwata; Kinya Ogawa; Kazuhiko Kurimoto, All of Ibaragi, Japan

[73] Assignee: Shin-Etsu Chemical Co., Ltd., Tokyo, Japan

[21] Appl. No.: 893,581

[22] Filed: Apr. 5, 1978

Related U.S. Application Data

[63] Continuation-in-part of Ser. No. 721,887, Sep. 9, 1976, abandoned.

[30] Foreign Application Priority Data

Sep. 11, 1975 [JP] Japan .................. 50/110158

[51] Int. Cl.$^2$ ............................................. C08F 14/06
[52] U.S. Cl. ........................................ 526/84; 526/81; 526/211; 526/214; 526/330; 526/344; 526/345
[58] Field of Search .......... 526/211, 214, 344, 345, 526/81, 84, 202

[56] References Cited

U.S. PATENT DOCUMENTS

| | | | |
|---|---|---|---|
| 2,380,905 | 7/1945 | Stewart | 526/211 |
| 2,434,536 | 1/1948 | Arundale | 526/81 |
| 2,523,596 | 9/1950 | Schulze et al. | 526/81 |
| 2,568,648 | 9/1951 | McCool | 526/211 |
| 2,878,237 | 3/1959 | Russell et al. | 526/214 |
| 3,510,467 | 5/1970 | Azoulay et al. | 526/81 |
| 3,663,520 | 5/1972 | Balwe et al. | 526/345 |
| 3,666,735 | 5/1972 | Rosis | 526/211 |
| 3,696,083 | 10/1972 | HWA | 526/343 |
| 3,736,282 | 5/1973 | Fetter et al. | 526/214 |
| 3,846,390 | 11/1974 | Ito et al. | 526/214 |

Primary Examiner—Harry Wong, Jr.
Attorney, Agent, or Firm—Bierman & Bierman

[57] ABSTRACT

Vinyl chloride polymers or copolymers having a relatively low molecular weight or degree of polymerization are prepared by a method in which an organic compound containing a mercapto group and a hydroxy or carboxyl group in a molecule is used as the chain transfer agent. Due to their very high activity, these chain transfer agents are used in amounts that are smaller than conventionally required quantities. The quality of the polymer products is satisfactory with respect to heat stability, occurrence of fish-eyes, particle size distribution, plasticizer absorption and ease of removing residual monomer.

6 Claims, No Drawings

METHOD FOR PREPARING VINYL CHLORIDE POLYMERS

This is a continuation-in-part application of Ser. No. 721,887 filed Sept. 9, 1976 now abandoned, and which claims the priority of Japanese Patent Application No. 50-110158 filed Sept. 11, 1975.

BACKGROUND OF THE INVENTION

This invention relates to a method for the preparation of vinyl chloride polymers or copolymers. In particular, the invention relates to an improvement in polymerization used to prepare vinyl chloride polymers or copolymers having a relatively low molecular weight or degree of polymerization.

Low molecular weight polyvinyl chloride resins can be produced by polymerization at relatively high temperatures. However, the conventional high-temperature polymerization method is undesirable because of an extended gellation time of the resin, inferior flow of the resin in the molding, and increased amounts of residual vinyl chloride monomer absorbed in the resin. In order to avoid these drawbacks, it has been proposed that certain chain transfer agents be added to the polymerization mixture. The chain transfer agents that are suitable for this purpose are, for example, saturated hydrocarbons, such as n-pentane and n-hexane; saturated or unsaturated chlorinated hydrocarbons, such as carbon tetrachloride, trichloroethylene and perchloroethylene; aldehydes, such as propionaldehyde and n-butylraldehyde; and certain mercapto-containing organic compounds, such as dodecyl mercaptan.

The above-mentioned chain transfer agents all have their respective defects. The saturated hydrocarbons are used in large quantities; about 8 to 10% by weight based on the amount of vinyl chloride monomer used. They produce monomer in order to produce vinyl chloride polymers having an average polymerization degree as low as about 700 by suspension polymerization at about 60° C. Hydrocarbons tend to be emitted into the atmosphere from the polymer products which are subjected to post-polymerization processes, or are released from the finished resin products during the course of storage, bringing about the problem of environmental pollution.

Other chain transfer agents are the saturated or unsaturated chlorinated hydrocarbons; they may be used in a reduced amount, for example, from 0.7 to 1.0% by weight based on the amount of vinyl chloride monomer used. However, the problems of environmental pollution and the detrimental effects on the human health cannot be solved due to the inherent toxicity of these compounds.

The aldehyde compounds used as chain transfer agents are eventually decomposed by heat in the course of a polymerization run, and the decomposition products exert a retarding effect on the velocity of the polymerization reaction and also exhibit toxic effects on the human body. The amount used may be reduced to 0.2 to 0.5% by weight based on the amount of vinyl chloride monomer used.

There are also several known methods in which certain mercapto-containing organic compounds are employed to control the molecular weight of polyvinyl chloride resins. For example, dodecyl mercaptan is used in the emulsion polymerization of various kinds of vinyl monomers, as disclosed in Japanese Patent Disclosure No. 50-32281; several kinds of alkyl thioglycolates are used in the polymerization of vinyl chloride, as disclosed in Japanese Patent Publication No. 49-31746; and several kinds of mercapto-containing organic compounds having 4 or less carbon atoms per molecule are used in low-temperature bulk polymerization of vinyl chloride in a continuous process, as disclosed in German Patent OLS No. 2046143. These prior art methods using mercapto-containing organic compounds are defective in that they require large amounts of the compounds which eventually lead to retardation of the polymerization velocity and coloring of the resultant polyvinyl chloride resin, as well as unpleasant odors inherent in the mercapto-compound.

SUMMARY OF THE INVENTION

It is therefore the primary object of the present invention to provide a novel and improved method by which vinyl chloride polymers or copolymers having a relatively low degree of polymerization can be readily obtained in suspension polymerization using a specific chain transfer agent without the disadvantages of the prior art described above. The vinyl chloride polymers obtained by the method of the present invention have excellent properties, such as porosity and particle size distribution. In addition, very little of the residual chain transfer or the decomposition products thereof remains in the polymers.

The method of the present invention comprises suspension polymerizing a vinyl chloride monomer, or a monomer mixture mainly composed of vinyl chloride, in the presence of an organic chain transfer agent. The agent contains at least one mercapto group and at least one hydroxy or carboxyl group. The method is further improved with respect to the properties of the polymer products produced by the use of very specific suspending agents in limited proportions.

The method of the present invention has several advantages over the prior art methods. For example, (1) the amount of the specified chain transfer agent to be added can be greatly reduced because of its very high activity; (2) the use of the chain transfer agents does not retard the velocity of the polymerization reaction; (3) the quality of the polyvinyl chloride resins obtained by the present method is excellent because neither the chain transfer agent itself nor the decomposition products thereof remain in the polymer products after the completion of the polymerization and processing; (4) the workability of the polymer products in fabrication is very good as a result of the well-developed porosity of the polymer particles; and (5) any unreacted monomer or monomers absorbed in the polymer particles can be easily removed from the polymer products after completion of the polymerization.

It is more advantageous to add the chain transfer agent into the polymerization mixture when the monomer conversion is in the range of between about 1% and 30%. The effect of this delay in the addition of the chain transfer agent is further increased when part (1.0% to 50%) of the total amount of the chain transfer agent is added into the polymerization mixture before the monomer conversion reaches 1% and the remainder of the chain transfer agent is added into the polymerization mixture when the monomer conversion is in the range of between about 1% and 30%. This method of divided addition is especially advantageous when the amount of the monomer charged into the polymerization reactor is increased to obtain better productivity. This is due to the elimination of any adverse effect on the particle size distribution of the polymer product.

DETAILED DESCRIPTION OF THE PREFERRED EMBODIMENTS

The method of the present invention will now be illustrated in further detail. The organic compounds employed as chain transfer agents in accordance with the present invention have, as have been described above, at least one mercapto group (—SH) in combination with at least one hydroxy group (—OH) or carboxyl (—COOH) group per molecule. They contain preferably from 2 to 7 carbon atoms per molecule. More preferably, from 2 to 4 carbon atoms per molecule. Suitable compounds are exemplified by SH-containing alcohols, such as 2-mercaptoethanol, thiopropyleneglycol and thioglycerine, and SH-containing carboxylic acids, such as thioglycolic acid, thiohydracrylic acid, thiolactic acid and thiomalic acid. Compounds containing more than 7 carbon atoms per molecule have a lower chain transfer activity and are therefore less valuable.

The amount of the chain transfer agent to be added to the polymerization mixture in accordance with the present invention is within the range of 0.001 to 0.5% by weight or, perferably, from 0.005 to 0.1% by weight based on the monomer or monomers charged into the polymerization reactor. The amount added is also dependent on the polymerization conditions, such as the polymerization temperature, degree of polymerization, etc. Naturally, two or more of the SH-containing compounds may be used at the same time.

Several advantages are realized by the use of the mercapto compounds as the chain transfer agent. First, the activity of the mercapto group-containing compounds used as the chain transfer agent is very high thereby greatly reducing the amount of the chain transfer agent needed. Second, the rate of the polymerization reaction is not retarded. Third, the mercapto group-containing compounds do not remain absorbed in the resulting vinyl chloride polymers, thus providing a superior product. Fourth, the polymer products have a well developed porosity which renders them easy to work with during processing. Fifth, the unreacted monomer is easily separated and removed from the polymer products after completion of polymerization.

Although the above-proposed method is somewhat satisfactory, it is characterized by a minor disadvantage, wherein a small amount (0.1% or less) of coarse particles (left on a 60-mesh screen) remain in the final resin.

The solution for this problem has been unexpectedly obtained by the present discovery, wherein the introduction of the chain transfer agent into the polymerization mixture is delayed until the monomer conversion has achieved a certain percentage. In this improved method, the chain transfer agent (an organic compound having at least one mercapto group and at least one hydroxy or carboxyl group simultaneously in the molecule) is introduced into the polymerization mixture during the suspension polymerization of vinyl chloride monomer or monomer mixture composed primarily of vinyl chloride while the monomer conversion is within the range fromm 1% to 30% or, more preferably, from 2% to 20%.

If the mercapto-containing organic compound is introduced into the aqueous medium at the time when the monomer conversion is lower than 1%, the improvement in the particle size distribution cannot be obtained in the products prepared by suspension polymerization because the suspended monomer droplets have not yet been stabilized. On the other hand, if the moment of introduction of the chain transfer agent is too late, (after the monomer conversion has exceeded 30%) a vinyl chloride polymer product having a desirably low average degree of polymerization is difficult to obtain because the opportunity for the compound to exhibit activity as a chain transfer agent is lost. If the same amount of the chain transfer agent is used, the average molecular weight of the resulting polymer products are about the same for both the present method and that of the prior art.

Optionally, the predetermined amount of the mercapto compound may be introduced into the polymerization mixture according to the present invention, either continuously or intermittently. However, the total amount of the chain transfer agent must be introduced when the monomer conversion is between about 1% and 30%.

The above-described delayed addition of the chain transfer agent is satisfactory in most cases. However, the present inventors have determined that there still exist problems when the amount of the monomer charged in the polymerization reactor is increased in order to increase productivity of the polymerization facilities. The inventors discovered that a satisfactory particle size distribution can be obtained by adding part of the chain transfer agent in an early stage of the reaction (before the monomer conversion reaches 1%) into the polymerization mixture. The remainder of the chain transfer agent is added later, (between about 1% and 30%). The amount of the chain transfer agent added in the earlier stage of the polymerization should be in the range of between about 1% and 50% of the total amount of the chain transfer agent.

When divided addition of the chain transfer agent is undertaken in this manner, the addition of two small an amount of the chain transfer agent at the earlier stage will not produce the desired result. On the other hand, the additional large amounts of the chain transfer agent added at the earlier stage raises the possibility of an adverse effect on the particle size distribution. Therefor, it is that the amount of the chain transfer agent be in the range between about 0.0005% and 0.028% by weight based on the amount of the monomer or monomer mixture. The remainder of the chain transfer agent is added at the later stage (when the monomer conversion is in the range of between about 1% and 30%).

Except for the use of chain transfer agents as defined above, the process of polymerization used in accordance with the method of the present invention is much the same as in the conventional polymerization of vinyl chloride in an aqueous medium. For example, suitable dispersing agents or suspending agents are water-soluble polymeric substances known in the prior art. Included are partially saponified polyvinyl alcohol, cellulose ethers (e.g., methyl cellulose and hydroxypropylmethylcellulose), polyvinyl pyrrolidine, vinyl acetate-maleic anhydride copolymers, starch and gelatin, all of which may be employed in conjunction with an anionic or nonionic surface active agent. The polymerization initiators employed in the method of the invention are also known and are selected from those oil-soluble free radical initiators which are organic peroxides, such as diisopropylperoxy dicarbonate, di-2-ethylhexylperoxy dicarbonate, acetylcyclohexylsulfonyl peroxide, t-butylperoxypivalate, benzoyl peroxide and laufoyl peroxide; and azo compounds, such as azobisisobutyronitrile, azobis-2,4-dimethylvaleronitrile and azobis-2,4-dimethoxy-2,4-dimethylvaleronitrile.

Although the method of the present invention is most advantageously used in the suspension polymerization of vinyl chloride or a monomer mixture mainly composed of vinyl chloride, it is also applicable to emulsion polymerization. The monomers copolymerizable with vinyl chloride in the monomer mixture include vinyl esters, such as vinyl acetate, vinyl ethers, acrylic and methacrylic acids, and esters thereof; maleic and fumaric acids and esters thereof; maleic anhydride; aromatic vinyl compounds; unsaturated nitrile compounds, such as acrylonitrile; vinylidene halides, such as vinylidene fluoride and vinylidene chloride; and olefins, such as ethylene and propylene.

Other conditions of polymerization such as the amount of polymerization initiators, polymerization temperature, polymerization time, and the like are not critical, and can be determined as in the conventional polymerization of vinyl chloride in an aqueous medium.

In the course of developing the method of the present invention, it has been noted that the dispersion of the monomer or monomers in an aqueous medium sometimes degrades or becomes unstable during the polymerization run, resulting in the production of inferior polymers with a coarse particle size distribution or an increase in the occurrence of fish-eyes. Therefore, the investigative efforts of the inventors have been directed toward solving this problem.

As a result, it has been established that the dispersion of the monomer can be stabilized if the monomer or monomers are dispersed in an aqueous medium in the presence of combined dispersing agents (i.e., composed of a partially saponified polyvinyl alcohol and a cellulose ether in very limited proportions). The polymer particles can be effectively prevented from becoming coarse, regardless of the intensity of agitation, the pH value of the aqueous medium and other conditions of polymerization. Further, the porosity of the polymer particles is improved by the use of combined dispersing agents. The advantages of the present method are that the removal of the residual monomer from the polymer product is very rapid and the occurrence of fish-eyes in articles fabricated from the polymer product is greatly reduced.

The proportion of partially saponified polyvinyl alcohol and cellulose ether should be within the range of from 20 to 80% by weight, preferably, from about 30 to 70% by weight, of the former and from 20 to 80% by weight, preferably from 30 to 70% by weight, of the latter. When the amount of the cellulose ether added is in excess of the amount of partially saponified polyvinyl alcohol, the particle size distribution of the polymer product becomes broader, and the occurrence of fish-eyes increases in the fabricated articles. On the other hand, an excessive amount of partially saponified polyvinyl alcohol leads to coarser particle size distribution in the polymer product. The amount of partially saponified polyvinyl alcohol and cellulose ether used as the dispersing agent, is in the range of from 0.01 to 0.5% by weight or, preferably, from 0.02 to 0.2% by weight based on the monomer or monomers in the polymerization mixture.

The partially saponified polyvinyl alcohol suitable for use in the present invention has a degree of saponification in the range of from 65 to 93% or, preferably, from 75 to 90%. Its molecular weight is such that a 4% by weight aqueous solution has a viscosity ranging preferably from 20 to 70 centipoise at 20° C. On the other hand, the cellulose ether suitable for use in the present invention is selected from methylcellulose, ethylcellulose, hydroxyethylcellulose, hydroxypropylmethylcellulose and the like; and a 2% by weight aqueous solution has a viscosity preferably in the range of from 10 to 100 centipoise at 20° C.

In addition to the above-defined partially saponified polyvinyl alcohol and cellulose ether, certain water-soluble polymeric substances, for example, vinyl acetate-maleic anhydride copolymers, starch, gelatin, and nonionic or anionic surface active agent may be added to the polymerization mixture to promote the dispersion of the monomer or monomers. The amount of auxiliary dispersing agents added should be as small as possible.

The following examples illustrate the method of the present invention but are not intended to limit the scope thereof.

EXAMPLE 1

60 kg of deionized water; 33 g of partially saponified polyvinyl alcohol having a degree of saponification of about 80% and a viscosity of about 35 centipoise at 20° C. as measured in a 4% by weight aqueous solution; 12 g of a methylcellulose with a methoxy-content of 30% by weight, having a viscosity of about 15 centipoise at 20° C. as measured in a 2% by weight aqueous solution; 30 kg of vinyl chloride monomer; 9.6 g of 12 g of azobis-2,4-dimethylvaleronitrile as the polymerization initiator and the various chain transfer agents as indicated in Table I were introduced into a 100-liter capacity stainless steel polymerization reactor. Polymerization was conducted at a temperature of 62° or 57° C. under agitation at 300 rpm for the periods of time indicated in Table I. The monomer was removed, and then the polymer product was recovered by dehydration and drying. The monomer-to-polymer conversion rate expressed in % and the average degree of polymerization as set forth in the same table.

The heat stability of the polymer products obtained was tested as follows. A blend of 100 parts of the polyvinyl chloride resin to be tested, 15 parts of lead stearate, 0.5 part of tribasic lead sulfate and 0.5 part of dibasic lead stearate (all parts being by weight) was milled until homogenous and fabricated into a sheet 2 mm thick by passing the blend through a hot roller at 170° C. These sheets were heated in a Geer oven at 180° C. until they were blackened. The periods of time required for blackening to occur were recorded in minutes and set forth in Table I as the heat stability.

Table I

| Exp. No. | Chain transfer agent (g) | Amount of initiator, g | Temperature, °C. | Polymerization time, hrs. | Conversion, % | Average degree of polymerization | Heat stability, min. |
|---|---|---|---|---|---|---|---|
| 1 | 2-Mercaptoethanol (7.5) | 12.0 | 62 | 7.3 | 92 | 690 | 135 |
| 2 | Thiopropylene- | | | | | | |

Table I-continued

| Exp. No. | Chain transfer agent (g) | Amount of initiator, g | Temperature, °C. | Polymerization time, hrs. | Conversion, % | Average degree of polymerization | Heat stability, min. |
|---|---|---|---|---|---|---|---|
|  | glycol (10.0) | 12.0 | 62 | 9.0 | 90 | 690 | 130 |
| 3 | 2-Mercaptoethanol (13.5) | 12.0 | 57 | 9.5 | 93 | 700 | — |
| 4 | Thioglycolic acid (10.5) | 12.0 | 62 | 8.0 | 92 | 690 | 140 |
| 5* | n-Pentane (2400) | 9.6 | 62 | 9.5 | 93 | 730 | 125 |
| 6* | Trichloroethylene (180) | 9.6 | 62 | 7.0 | 90 | 700 | 130 |
| 7* | Trichloroethylene (300) | 9.6 | 57 | 8.5 | 92 | 710 | — |

*Controls.

EXAMPLE 2

60 kg of deionized water, 33 g of the same partially saponified polyvinyl alcohol used in Example 1, 12 g of the same methylcellulose used in Example 1, 24 kg of vinyl chloride monomer, 6 kg of vinyl acetate monomer, 12.0 g of azobis-2,4-dimethylvaleronitrile and 2-mercaptoethanol or trichloroethylene indicated in Table II were introduced into the same polymerization reactor as employed in Example I. Polymerization was conducted at 62° C. for 8 hours. The unreacted monomer was removed, and then the vinyl chloride-vinyl acetate copolymer product was recovered by dehydration and drying. The monomer-to-polymer conversion and the average degree of polymerization of the polymer-products are set forth in Table II.

The vinyl chloride-vinyl acetate copolymers were tested for heat stability in the same manner as in Example 1, except that the temperature of the oven was set at 120° C. instead of 180° C. The results of the tests are also shown in Table II.

Table II

|  | Experiment No. | |
|---|---|---|
|  | 8 | 9* |
| Chain transfer agent (g) | 2-Mercaptoethanol (17) | Trichloroethylene (600) |
| Conversion, % | 92 | 90 |
| Average degree of polymerization | 690 | 700 |
| Heat stability, min. | 75 | 70 |

*Control

EXAMPLE 3

50 kg of deionized water, the mercapto-containing organic compound of trichloroethylene as the chain transfer agent and the combined dispersing agents composed of a partially saponified polyvinyl alcohol and a cellulose ether were introduced into a 100-liter capacity stainless steel polymerization reactor as indicated in Table III. The vinyl chloride monomer or vinyl chloride-vinyl acetate monomer mixture and polymerization initiators used are also indicated in Table III. Polymerization was conducted at the polymerization temperature and agitation velocity as set forth in the same table.

In Table III, the following abbreviations were used:

PVA-A: Partially saponified polyvinyl alcohol with a saponification degree of 80% and a viscosity of 35 centipoise at 20° C. as measured in a 4% by weight aqueous solution.

PVA-B: Partially saponified polyvinyl alcohol with a saponification degree of 88% and a viscosity of 30 centipoise at 20° C. as measured in a 4% by weight aqueous solution.

PVA-C: Partially saponified polyvinyl alcohol with a saponification degree of 80% and a viscosity of 50 centipoise at 20° C. as measured in a 4% by weight aqueous solution.

Cel-A: Hydroxypropylmethylcellulose with a methoxy group content of 30% by weight, hydroxypropoxy group content of 10% by weight and a viscosity of 60 centipoise at 20° C. as measured in a 2% by weight aqueous solution.

Cel-B: Hydroxypropylcellulose with a hydroxypropoxy group content of 65% by weight and a viscosity of 50 centipoise at 20° C. as measured in a 2% by weight aqueous solution.

Cel-C: Hydroxypropylmethylcellulose with a mexthoxy group content of 20% by weight, hydroxypropoxy group content of 8% by weight and a viscosity of 100 centipoise at 20° C. as measured in a 2% by weight aqueous solution.

IPP: Diisopropyl peroxydicarbonate.
PV: t-Butyl peroxypivalate.
DMVN: Azobis-2,4-dimethyl valeronitrile.
VC: Vinyl chloride.
VAc: Vinyl acetate.

Table III

| Exp. No. | Monomer (kg) | Chain transfer agent (g) | Dispersing agent (g) | Initiator, (g) | Temperature, °C. | Agitation, R.P.M. |
|---|---|---|---|---|---|---|
| 10 | VC (25) | 2-Mercaptoethanol (8) | PVA-A(10) Cel-A(7.5) | IPP (10) | 61 | 350 |
| 11 | VC (25) | 2-Mercaptoethanol (8) | PVA-A(10) Cel-A(7.5) | IPP (10) | 61 | 300 |
| 12 | VC (25) | 2-Mercaptoethanol (8) | PVA-A(10) Cel-A(7.5) | IPP (10) | 61 | 270 |
| 13 | VC (25) | 2-Mercaptoethanol (2) | PVA-A(10) Cel-A(7.5) | PV (10) | 63 | 350 |
| 14 | VC (25) | 2-Hydroxypropyl | PVA-C(10) Cel-B(7.5) | DMVN (10) | 61 | 350 |

Table III-continued

| Exp. No. | Monomer (kg) | Chain transfer agent (g) | Dispersing agent (g) | Initiator, (g) | Temperature, °C. | Agitation, R.P.M. |
|---|---|---|---|---|---|---|
| | | mercaptan (8) | | | | |
| 15 | VC (25) | Thioglycerine (8) | PVA-B(4) Cel-C(12) | DMVN (10) | 61 | 350 |
| 16 | VC (25) | 2-Mercaptoethanol (15) | PVA-B(7) Cel-A(11) | IPP (10) | 55 | 350 |
| 17 | VC (22) VAc (3) | 2-mercaptoethanol (15) | PVA-A(10) Cel-A(15) | IPP (10) | 56 | 300 |
| 18 | VC (25) | Trichloroethylene (200) | PVA-A(10) Cel-A(7.5) | PV (10) | 61 | 350 |
| 19 | VC (25) | Dodecylmercaptan (20) | PVA-A(10) Cel-A(7.5) | DMVN (10) | 61 | 350 |
| 20 | VC (25) | 2-Ethylhexyl thioglycolate (50) | PVA-A(10) Cel-A(7.5) | DMVN (10) | 60 | 350 |
| 21 | VC (25) | 2-Mercaptoethanol (8) | PVA-B(25) Cel-A(1) | DMVN (10) | 61 | 350 |
| 22 | VC (25) | 2-Mercaptoethanol (8) | PVA-A(18) Cel-A(2) | DMVN (10) | 61 | 350 |
| 23 | VC (25) | 2-Mercaptoethanol (8) | PVA-A(1) Cel-A(20) | DMVN (10) | 61 | 350 |

Notes:
Experiments 18 to 20 are controls. Experiments 21 to 23 demonstrate the effect of using combined dispersing agents in proportions outside the preferred range.

The polymer products resulting from the above polymerization tests were then tested for average degree of polymerization, particle size distribution, occurrence of fish-eyes and dioctyl phthalate (DOP) absorption, and the results are set out in Table IV. Also shown in the table is the rate of monomer removal. The manner of determining the occurrence of fish-eyes, DOP absorption, the velocity of monomer removal was as follows:

Occurrence of fish-eyes: A mixture of 50 g of the polymer product, 25 g of DOP, 0.3 g of tribasic lead sulfate, 1.0 g of lead stearate, 0.01 g of titanium dioxide and 0.005 g of carbon black was left standing for about 30 minutes and then milled in a hot roller mill at 140° C. for 7 minutes. The blended mixture was taken out from the roller mill in the form of a sheet 0.2 mm thick, and the number of the transparent particles (fish-eyes) occurring in an area of 100 cm² was counted.

DOP absorption: A mixture of 10 g of the polymer product to be tested and 20 g of DOP was left standing for 1 hour. The mixture was then subjected to centrifugal separation to remove the unabsorbed DOP. The percentages of the DOP absorbed in the polymer was determined by weighing.

Velocity of monomer removal: After the polymerization reaction was commmpleted, 1-liter of the polymer slurry was kept at 80° C. by heating in a flask with agitation while nitrogen gas was blown into the slurry at a rate of 0.1 liter/minute. Small portions of the polymer slurry were taken at certain time intervals and analyzed for the monomer content to determine time required to reduce the monomer content to a half of the original value.

Table IV

| Exp. No. | Average degree of polymerization | Particle size distribution, % Passed through screen of | | | Fish-eyes, pieces | DOP absorption, % | Monomer removal, min. |
|---|---|---|---|---|---|---|---|
| | | 60 mesh | 100 mesh | 200 mesh | | | |
| 10 | 650 | 99.9 | 65.0 | 3.2 | 13 | 18.3 | 10 |
| 11 | 650 | 99.9 | 43.5 | 1.8 | 20 | 17.8 | 12 |
| 12 | 640 | 89.3 | 35.6 | 0.5 | 85 | 17.5 | 12 |
| 13 | 810 | 99.8 | 56.3 | 2.4 | 18 | 15.7 | 15 |
| 14 | 680 | 99.8 | 52.5 | 2.8 | 15 | 17.8 | 12 |
| 15 | 750 | 99.9 | 65.2 | 4.2 | 8 | 17.7 | 12 |
| 16 | 710 | 99.9 | 50.1 | 5.1 | 10 | 18.9 | 9 |
| 17 | 530 | 99.5 | 60.5 | 3.1 | — | — | — |
| 18 | 650 | 99.9 | 45.3 | 1.6 | 35 | 14.8 | 18 |
| 19 | 680 | 99.9 | 56.0 | 1.8 | 45 | 15.2 | 18 |
| 20 | 730 | 99.9 | 52.3 | 1.1 | 28 | 15.5 | 13 |
| 21 | 640 | 91.3 | 52.0 | 5.2 | 2000 | 15.8 | 17 |
| 22 | 650 | 92.0 | 60.5 | 2.0 | 25 | 16.3 | 17 |
| 23 | 660 | 33.0 | 25.5 | 11.5 | * | 23.2 | 30** |

*Too many to count.
**Or longer.

In the following examples, the procedures for the determination of the average molecular weight, the amount of the residual vinyl chloride monomer, and the heat stability were as follows and the abbreviations DMVN, PV and LPO appearing in the tables are for α,α'-azobis-2,4-dimethylvaleronitrile, tert-butyl peroxypivalate and lauroyl peroxide, respectively.

Average molecular weight: Determined by the method specified in JIS K 6721.

Residual vinyl chloride monomer: Gas chromatographic analysis for a solution of 1 g of the polymer in 25 ml of tetrahydrofuran.

Heat stability: A blend of 100 g of the vinyl chloride polymer obtained in the example, 0.5 g of an organotin mercaptide (TUS-8831, product of Nitto Chemical Co., Japan) and 0.5 g of stearic acid was milled for 5 minutes on a roller blender having a temperature of 160° C. and shaped into a sheet of 0.8 mm thick. The sheet thus prepared was kept in an oven at 170° C. for 40 minutes and the sample removed from the oven was examined visually. The results were recorded such that (a) represented a sample appearing the same as before heating (even after extension of the heating time to 60 minutes); (b) slightly discolored; (c) brown discoloration; (d) dark brown discoloration; and (e) completely blackened.

EXAMPLE 4

30 kg of deionized water, 20 g of partially saponified polyvinyl alcohol, 15 kg of vinyl chloride monomer and a polymerization initiator as indicated in Table V in an amount shown in the same table, were introduced into a 50-liter stainless steel polymerization reactor and the polymerization reaction was started by elevating the temperature. When the monomer conversion reached the percentage as indicated in the table, a mercapto-containing organic compound as indicated in the table was introduced into the polymerization mixture and the polymerization was continued at the temperature given in the table. After the period of time indicated in the table, the polymerization reaction was stopped and, after removal of the unreacted vinyl chloride monomer, the resultant polymer in the aqueous slurry was dehydrated and dried into a finished polyvinyl chloride product.

The polyvinyl chloride product thus obtained was examined for the average degree of polymerization, particle size distribution, amount of the residual vinyl chloride monomer, dioctyl phthalate absorption and heat stability to give the results as set out in the table.

Experiments No. 32 and No. 33 in Table V were undertaken for purposes of comparison in which 10 g of 2-mercaptoethanol was introduced into the polymerization mixture either at the time when the monomer conversion was about 50% (Experiment No. 32) or before the initiation of the polymerization reaction. The remaining variables for these experiments were as shown in the table and the results of these tests are also set forth in the table.

EXAMPLE 5

30 kg of deionized water, 20 g of partially saponified polyvinyl alcohol, 15 kg of vinyl chloride monomer and $\alpha,\alpha'$-azobis-2,4-dimethylvaleronitrile in an amount as indicated in Table VI, were introduced into the same reactor used in Example 4. The polymerization reactor was started by elevating the temperature. During polymerization, 2-mercaptoethanol in an amount as indicated in the table was added to the polymerization mixture at the time when the monomer conversion was in the range as indicated in the table and the polymerization reaction was continued at a temperature of 62° C. or 58° C.

After an overall polymerization time of 8 hours or 9 hours, the polymerization reaction was stopped and, after removal of the unreacted vinyl chloride monomer, the resultant polymer in the aqueous slurry was dehydrated and dried to give the finished polyvinyl chloride product. The properties of the polymer products thus obtained are set forth in the table.

Experiments No. 36 and No. 37 in Table VI were undertaken for purposes of comparison in which 2-mercaptoethanol was introduced into the polymerization reactor, together with deionized water, partially saponified polyvinyl alcohol, and vinyl chloride monomer (Experiment No. 36) or trichloroethylene (Experiment No. 37) was used as the chain transfer agent in place of 2-mercaptoethanol. The other polymerization conditions were the same as in Experiment No. 36. The properties of the thus obtained comparative polymer products are given in the table.

Table V

|  |  | Present Invention | | | | | | | | Control | |
|---|---|---|---|---|---|---|---|---|---|---|---|
| Experiment No. | | 24 | 25 | 26 | 27 | 28 | 29 | 30 | 31 | 32 | 33 |
| Chain transfer agent, (g) | | (a) 3.8 | (b) 4.5 | (c) 4.0 | (d) 10.0 | (a) 10.0 | (a) 10.0 | (b) 12.0 | (b) 2.0 | (a) 10.0 | (a) 10.0 |
| Initiator (g) | | DMVN 4.5 | PV 5.0 | DMVN 4.5 | DMVN 4.5 | DMVN 4.5 | DMVN 4.5 | DMVN 4.5 | LPO 17.0 | DMVN 5.0 | DMVN 5.0 |
| Polymerization temperature, °C. | | 62 | 62 | 62 | 58 | 58 | 58 | 56 | 64 | 58 | 58 |
| % Monomer conversion when chain transfer agent was added | | 17 | 12 | 15 | 8 | 4 | 20 | 10 | 12 | 50 | 0 |
| (hrs. from the beginning of polymerization) | | (1.0) | (1.0) | (1.0) | (1.0) | (0.5) | (2.0) | (1.5) | (1.0) | (4.0) | (0) |
| Overall polymerization time (hrs.) | | 8 hrs. | 8 hrs. | 8 hrs. 45 mins. | 9 hrs. | 9 hrs. 30 mins. | 9 hrs. | 9 hrs. 10 mins. | 8 hrs. 40 mins. | 8 hrs. 30 mins. | 9 hrs. 30 mins. |
| Average degree of polymerization | | 680 | 700 | 710 | 720 | 680 | 700 | 690 | 720 | 830 | 690 |
| Particle size distribution, % passed | 60 mesh | 100.0 | 100.0 | 100.0 | 100.0 | 98.8 | 100.0 | 100.0 | 100.0 | 100.0 | 60.5 |
| through screen of | 200 mesh | 1.5 | 2.0 | 1.2 | 2.5 | 3.9 | 1.5 | 1.0 | 0.9 | 2.5 | 2.2 |
| Residual monomer in the polymer, p.p.m. | | 15 | 13 | 14 | 10 | 9 | 9 | 10 | 30 | 42 | 50 |
| DOP absorption, % | | 17.5 | 16.5 | 17.0 | 18.5 | 18.0 | 19.0 | 19.5 | 17.0 | 16.2 | 19.5 |
| Heat stability | | B | A | C | B | B | C | B | A | D | D |

Chain transfer agent:
(a) 2-mercaptoethanol;
(b) 3-mercaptopropanol;
(c) thioglycolic acid;
(d) 2-mercaptopropanol.

Table VI

|  |  | Present Invention | | Control | |
|---|---|---|---|---|---|
| Experiment No. | | 34 | 35 | 36 (same as 33) | 37 |
| Chain transfer agent (g) | | 2-Mercapto-ethanol (3.8) | 2-Mercapto-ethanol (10.0) | 2-Mercapto-ethanol (10.0) | Trichloro-ethylene (300) |
| DMVN used, g | | 4.5 | 4.5 | 5.0 | 4.5 |
| Polymerization temperature, °C. | | 62 | 58 | 58 | 62 |
| % Monomer conversion when Chain transfer agent was added (hrs. from the beginning of polymerization | | 15–25 (1–2) | 11–19 (1–3) | 0 (0) | 0 (0) |
| Overall polymerization time | | 8 hrs. | 9 hrs. | 9 hrs. 30 mins. | 9 hrs. 30 mins. |
| Average degree of polymerization | | 700 | 710 | 690 | 710 |
| Particle size distribution, % passed through screen of | 60 mesh | 100.0 | 99.9 | 60.5 | 100.0 |
|  | 200 mesh | 0.8 | 0.5 | 2.2 | 2.1 |
| Residual monomer in the polymer, p.p.m. | | 12 | 9 | 50 | 125 |
| DOP absorption, % | | 18.0 | 17.0 | 19.5 | 15.0 |
| Heat stability | | B | B | D | E |

EXAMPLE 6

30 kg of deionized water, 20 g of partially saponified polyvinyl alcohol, a monomer mixture composed of 12.7 kg of vinyl chloride monomer and 2.3 kg of vinyl chloride monomer and 2,3 kg of vinyl acetate monomer and 7.5 g of α,α'-azobis-2,4-dimethylvaleronitrile were introduced into the same reactor used in Example 4. The polymerization reaction was begun and when the monomer conversion reached 12%, 15.0 g of 2-mercaptoethanol were added to the polymerization mixture and the polymerization reaction was continued. After an overall polymerization time of 11 hours and 20 minutes, the polymerization reaction was stopped and, after removal of the unreacted monomers, the resultant copolymer in the aqueous slurry was dehydrated and dried to give a finished product of vinyl chloride-vinyl acetate copolymer. The properties of thus prepared copolymer product were examined to give the results as set forth in Experiment No. 38 in Table VII.

Comparative Experiments No. 39 and No. 40 show that 15 g of 2-mercaptoethanol were introduced into the polymerization reactor together with the deionized water, partially saponified polyvinyl alcohol, vinyl chloride monomer and other ingredients. The overall polymerization time was extended to 12 hours (Experiment No. 39) or 200 g of trichloroethylene were used as the chain transfer agent in place of 15 g of 2-mercaptoethanol and the overall polymerization time was extended to 12 and a half hours (Experiment No. 40) to give the vinyl chloride-vinyl acetate copolymers. The properties of the resulting products are set forth in the table.

Table VII

|  |  | Present Invention | | Control |
|---|---|---|---|---|
| Experiment No. |  | 38 | 39 | 40 |
| Chain transfer agent, (g) |  | 2-Mercapto-ethanol (15.0) | 2-Mercapto-ethanol (15.0) | Trichloro-ethylene (200) |
| DMVN used, g |  | 7.5 | 7.5 | 7.5 |
| Polymerization temperature, °C. |  | 56 | 0 | 56 |
| % Monomer conversion when chain transfer agent was added (hrs. from the beginning of polymerization) |  | 12 (1) | 0 (0) | 0 (0) |
| Overall polymerization time |  | 11 hrs. 20 mins. | 12 hrs. | 12 hrs. 30 mins. |
| Average degree of polymerization |  | 560 | 550 | 570 |
| Particle size distribution, % passed through screen of | 60 mesh | 100.0 | 16.5 | 100.0 |
|  | 200 mesh | 2.8 | 1.5 | 3.5 |

EXAMPLE 7

500 kg of deionized water, 120 g of partially saponified polyvinyl alcohol, 60 g of hydroxypropyl methylcellulose, 350 kg of vinyl chloride monomer and amounts of the chain transfer agent and polymerization initiator indicated in Table VIII were introduced into a 1,000 liter stainless steel polymerization reactor. The polymerization reaction was started by elevating the temperature and when the monomer conversion reached the percentage as shown in the table, an additional amount of the same chain transfer agent was added to the polymerization mixture and the polymerization reaction was continued at the same polymerization temperature until the pressure inside the polymerization reactor reduced to 7 kg/cm²G. Then, the polymerization reaction was stopped by purging the unreacted vinyl chloride monomer.

The resultant vinyl chloride polymerizate was dehydrated and dried in a fluidizing drier operated with hot air at 75° C. for 20 minutes after the temperature of the polymerizate reached 70° C.

As a comparison, the same experimental procedures were undertaken except that all of the 2-mercaptoethanol was added before the beginning of the polymerization reaction (Experiment No. 48). Experiment No. 49 shows the addition of a portion of the chain transfer agent before the polymerization reaction and the balance added when the monomer conversion reached 0.5%. Experiment No. 50 is the same as Experiment No.

49, except that trichloroethylene was used instead of the mercapto compound.

tion of the polymerization reaction was the same as in Example 7, and the results of the experiments are sum- Table VIII

| Experiment No. | | Present invention | | | | | | | Control | | |
|---|---|---|---|---|---|---|---|---|---|---|---|
| | | 41 | 42 | 43 | 44 | 45 | 46 | 47 | 48 | 49 | 50 |
| Chain transfer agent | | (a) | (a) | (a) | (a) | (d) | (d) | (a) | (a) | (a) | (e) |
| First addition of chain transfer agent, % of monomer | | 0.010 | 0.015 | 0.005 | 0.010 | 0.007 | 0.015 | 0 | 0.030 | 0.010 | 0.60 |
| Second addition of chain transfer agent, % of monomer (at % monomer conversion) | | 0.020 (15) | 0.020 (10) | 0.085 (25) | 0.060 (15) | 0.028 (5) | 0.025 (2) | 0.030 (15) | 0 — | 0.025 (0.5) | 0 — |
| Polymerization initiator, (% of monomer) | | DMVN (0.04) | DMVN (0.04) | DMVN (0.05) | PV (0.04) | DMVN (0.04) | DMVN (0.04) | DMVN (0.04) | DMVN (0.04) | DMVN (0.04) | DMVN (0.04) |
| Polymerization temperature, °C. | | 62 | 62 | 55 | 57 | 62 | 63 | 63 | 63 | 62 | 63 |
| Particle size distribution, % passed through screen of | 60 mesh | 100 | 100 | 100 | 100 | 100 | 100 | 100 | 20 | 23 | 100 |
| | 100 mesh | 85 | 77 | 88 | 87 | 72 | 75 | 82 | 15 | 18 | 72 |
| | 200 mesh | 0.2 | 1.8 | 0.7 | 1.5 | 2.2 | 0.8 | 2.5 | 5.5 | 6.2 | 1.2 |
| Heat stability | | A | B | B | A | B | A | C | C | D | A |
| Residual monomer in the polymer, p.p.m. | | 1.5 | 1.0 | 1.8 | 0.5 | 1.2 | 0.9 | 50 | 18 | 23 | 350 |
| Average degree of polymerization | | 650 | 670 | 640 | 660 | 640 | 640 | 660 | 650 | 670 | 660 |

Chain transfer agent (e): trichloroethylene

EXAMPLE 8

600 kg of deionized water, 120 g of partially saponified polyvinyl alcohol, 60 g of hydroxypropyl methylcellulose, 250 kg of vinyl chloride monomer and the chain transfer agent and polymerization initiator indicated in Table IX, were introduced into the same reactor used in Example 7. The polymerization reaction was begun by elevating the temperature and when the monomer conversion reached the percentage shown in the table, an additional amount of the same chain transfer agent was added and the polymerization reaction was continued at the same temperature until the pressure inside the polymerization reactor dropped to 7 kg/cm²G. Then, the polymerization reaction was stopped by purging the unreacted vinyl chloride monomer. The treatment of the polymerizate after completion of the polymerization reaction was the same as in Example 7, and the results of the experiments are summarized in the table.

As a comparison, all conditions remained the same, except that all of the 2-mercaptoethanol was added before the polymerization reaction was begun (Experiment No. 54).

Table IX

| Experiment No. | | Present invention | | | Control |
|---|---|---|---|---|---|
| | | 51 | 52 | 53 | 54 |
| Chain transfer agent | | (a) | (a) | (a) | (a) |
| First addition of chain transfer agent, % of monomer | | 0.010 | 0.005 | 0.015 | 0.030 |
| Second addition of chain transfer agent, % of monomer (at % monomer conversion) | | 0.025 (15) | 0.020 (10) | 0.025 (20) | 0 — |
| Polymerization initiator, (% of monomer) | | DMVN (0.04) | DMVN (0.04) | DMVN (0.04) | DMVN (0.04) |
| Polymerization temperature, °C. | | 62 | 62.5 | 62 | 63 |
| Particle size distribution, % passed through screen of | 60 mesh | 100 | 100 | 100 | 98 |
| | 100 mesh | 89 | 90 | 78 | 45 |
| | 200 mesh | 1.5 | 0.8 | 1.5 | 3.5 |
| Heat stability | | A | B | C | C |
| Residual monomer in the polymer, p.p.m. | | 0.8 | 1.5 | 1.5 | 20 |
| Average degree of polymerization | | 660 | 680 | 650 | 660 |

What is claimed is:

1. A method for the preparation of a polymer product by the polymerization of vinyl chloride or a monomer mixture composed mainly of vinyl chloride in an aqueous medium which comprises adding a first portion of a chain transfer agent selected from the group consisting of alcohols and carboxylic acids each having at least one mercapto group into the polymerization mixture before the conversion of said monomer or said monomer mixture reaches 1%, said first portion being 1.0 to 50% of the total amount of said chain transfer agent, and adding a second portion of said chain transfer agent to said polymerization mixture when the conversion of said monomer or said monomer mixture is between about 1% and 30%, the total amount of said chain transfer agent being in the range of between about 0.001% and 0.5% by weight based on the weight of said monomer or monomer mixture.

2. A method as claimed in claim 1, wherein said chain transfer agent has from 2 to 7 carbon atoms.

3. The method as claimed in claim 1, wherein said chain transfer agent is selected from the group consisting of 2-mercaptoethanol, 2-mercaptopropanol, 2-hydroxypropyl mercaptan and thioglycerin.

4. The method as claimed in claim 1, wherein said chain transfer agent is 2-mercaptoethanol.

5. The method as claimed in claim 1, wherein said chain transfer agent is selected from the group consisting of thioglycolic acid, thiohydroacrylic acid, thiolactic acid and thiomalic acid.

6. The method as claimed in claim 1, wherein the amount of the chain transfer agent added into the polymerization mixture before the conversion of the monomer or monomer mixture reaches 1% is in the range of from 0.0005% to 0.028% by weight based on the weight of said monomer or monomer mixture.

* * * * *